Figure 1:
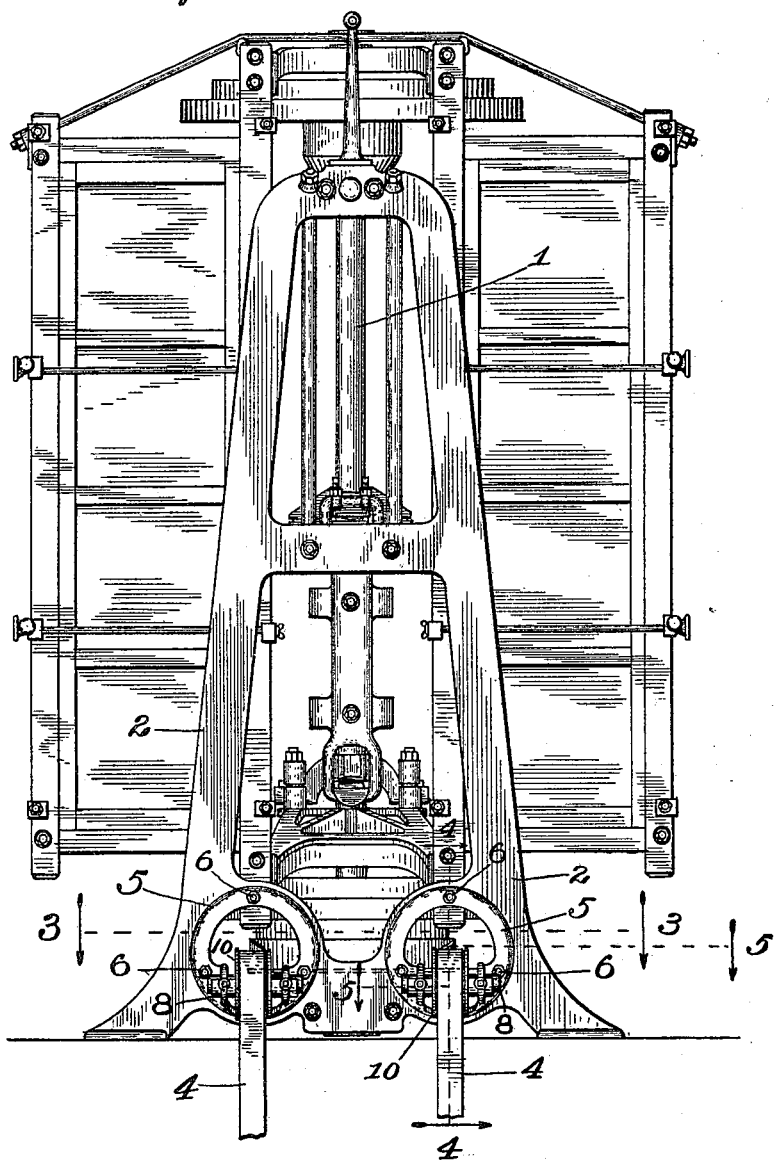

No. 670,124. Patented Mar. 19, 1901.
J. WARRINGTON.
SHIFTABLE BELT GUIDE.
(Application filed Aug. 3, 1900.)
(No Model.) 2 Sheets—Sheet 1.

WITNESSES:
C. S. Frye.
J. A. Walsh.

INVENTOR
Jesse Warrington,
BY
Chester Bradford.
ATTORNEY.

THE NORRIS PETERS CO., PHOTO-LITHO., WASHINGTON, D. C.

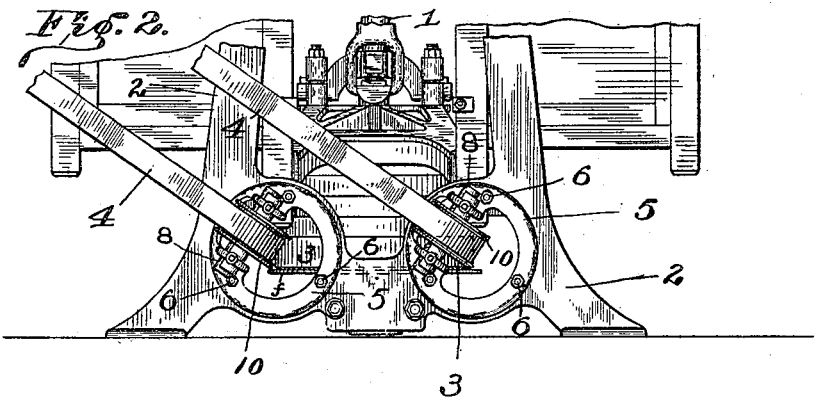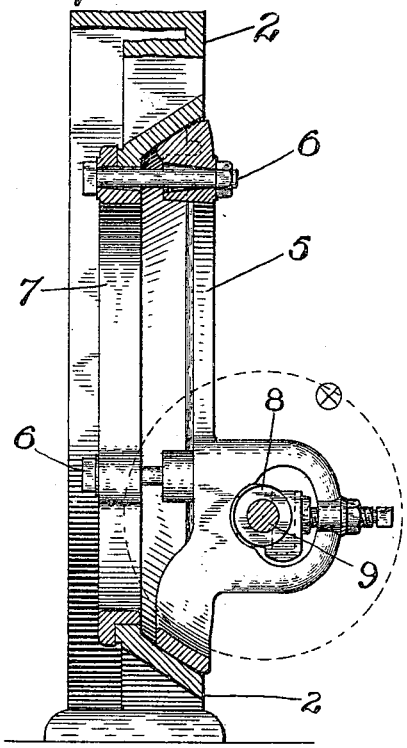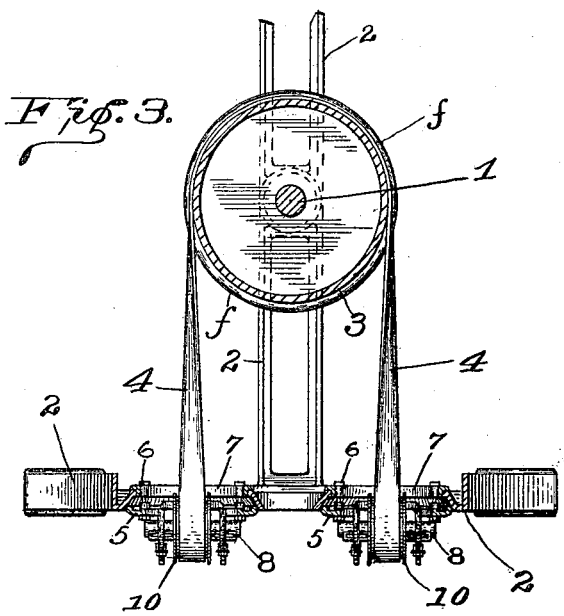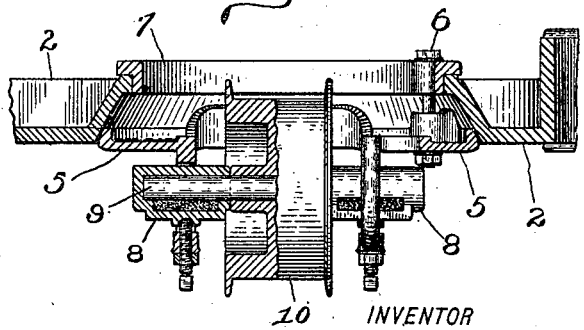

UNITED STATES PATENT OFFICE.

JESSE WARRINGTON, OF INDIANAPOLIS, INDIANA, ASSIGNOR OF ONE-HALF TO NORDYKE & MARMON COMPANY, OF SAME PLACE.

SHIFTABLE BELT-GUIDE.

SPECIFICATION forming part of Letters Patent No. 670,124, dated March 19, 1901.

Application filed August 3, 1900. Serial No. 25,739. (No model.)

*To all whom it may concern:*

Be it known that I, JESSE WARRINGTON, a citizen of the United States, residing at Indianapolis, in the county of Marion and State of Indiana, have invented certain new and useful Improvements in Shiftable Belt-Guides, of which the following is a specification.

It is a common thing to manufacture machines of various kinds ready for use, so that when they reach the place where they are to be used it is only necessary to set the machine as a whole in position and apply the driving-belt thereto. The line-shaft or counter-shaft carrying the pulley from which said belt runs may be in any direction from the machine, and it is desirable, therefore, to provide means by which the said belt may be accurately guided from the driver, wherever it may be situated, to the pulley of the machine which it is to drive.

The object, therefore, of my said invention is to provide a means by which the belt for driving a piece of machinery may be accurately guided to the driving-pulley of such a machine from any desired direction.

Said invention will be first fully described, and the novel features thereof then pointed out in the claims.

Referring to the accompanying drawings, which are made a part hereof and on which similar reference characters indicate similar parts, Figure 1 is an elevation of a machine provided with shiftable belt-guides embodying my said invention and showing the belt for driving the machine coming from below; Fig. 2, a fragmentary elevation of the lower portion of such a machine with the shiftable belt-guides shifted around, showing the belt coming in from a different direction; Fig. 3, a horizontal sectional view as seen when looking downwardly from the dotted line 3 3 in Fig. 1; Fig. 4, a detail sectional view, on an enlarged scale, as seen when looking from the dotted line 4 4 in Fig. 1, the idle pulley being removed from the shaft and its position indicated by dotted lines in order to show the construction of the housing more clearly; and Fig. 5, a detail horizontal sectional view looking downwardly from the dotted line 5 5 in Fig. 1.

I have illustrated my invention in connection with a bolting-machine for use in flouring-mills; but it may, obviously, be used with machines of many kinds and for many purposes, and I desire, therefore, to be understood as claiming the same in connection with or embodied in any machine with which it may be desired to use it. The machine to which the invention is applied being therefore immaterial so far as my present invention is concerned, and being shown merely for purposes of illustration, will not be further described herein, except incidentally in describing the invention.

A shaft 1 is mounted in suitable bearings in the frame 2 of the machine to be operated and bears a driving-pulley 3. In the machine illustrated the shaft 1 is a vertical shaft and the pulley 3 is consequently horizontal, and therefore, preferably, has a flange $f$ around its lower edge the better to support the belt 4, by which said pulley and shaft are driven.

The frame 2 has circular apertures therein at points opposite the pulley 3, which apertures are concave to receive structures of spherical shape at the points of contact.

Within circular apertures in the frame 2 I place two annular idler-housings 5, which are adapted to be shifted to any angle desired and to be held to adjusted position by means of clamping-bolts 6, extending through clamping-rings 7. As above stated and as best shown in Fig. 4, the circular apertures in the frame 2 are given a spherical form and the peripheries of the idler-housings 5 are correspondingly formed, while the rings 7 are preferably flanged, so as to have a proper bearing on the rear side of the adjacent portions of the frame 2, said rings being mere keepers for the annular idler-housings, as will be readily understood.

The idler-housings 5 contain suitable bearings 8, in which are mounted the shafts 9, on which are the idler-pulleys 10. As the housings 5 are revolved they carry these idler-pulleys around to any position desired, as will be readily understood upon a comparison of Figs. 1 and 2. As will also be noticed upon a comparison of said figures, the center of each idler-pulley is always in the same line tangent to the main pulley 3, irrespective of the position to which the idler-pulley may be adjusted, so that the belt in running over said pulleys is always led onto said pulley 3 in the same manner and with the same result. This unvarying relative position of the operative surfaces of the pulleys is attained as desired by making the centers of the apertures in the machine-frame in which the idler-housings are placed in parallel lines tangent to the pulley 3 and then arranging the idler-pulleys so that their operative surfaces just reach the center of the housings in which they are mounted, while by means of the spherical form of the surfaces of the parts 2 and 5 at the points where they come in contact any desired adjustment may be secured.

Having thus fully described my said invention, what I claim as new, and desire to secure by Letters Patent, is—

1. The combination, with a machine having a shaft and a pulley thereon arranged to be driven, of continuous annular idler-housings mounted in circular apertures in said frame, a clamping-ring arranged to bear on said frame behind the aperture, and bolts passing from said ring through said aperture and the annular idler-housings, whereby said housings are rendered adjustable in all directions, substantially as and for the purposes set forth.

2. The combination, with a machine having a tapered circular aperture in the frame thereof of a spherical formation, of an idler-housing correspondingly shaped on its periphery and fitting into said aperture, a bolt-carrying device beyond said aperture and adapted to bear against said frame, and bolts extending from said device through said idler-frame whereby the same may be drawn firmly into and seated within said aperture, substantially as set forth.

In witness whereof I have hereunto set my hand and seal, at Indianapolis, Indiana, this 30th day of July, A. D. 1900.

JESSE WARRINGTON. [L. S.]

Witnesses:
CHESTER BRADFORD,
JAMES A. WALSH.